June 8, 1971        J. R. COYLE        3,583,045
PARACHUTE CONNECTOR LINK
Filed May 19, 1969
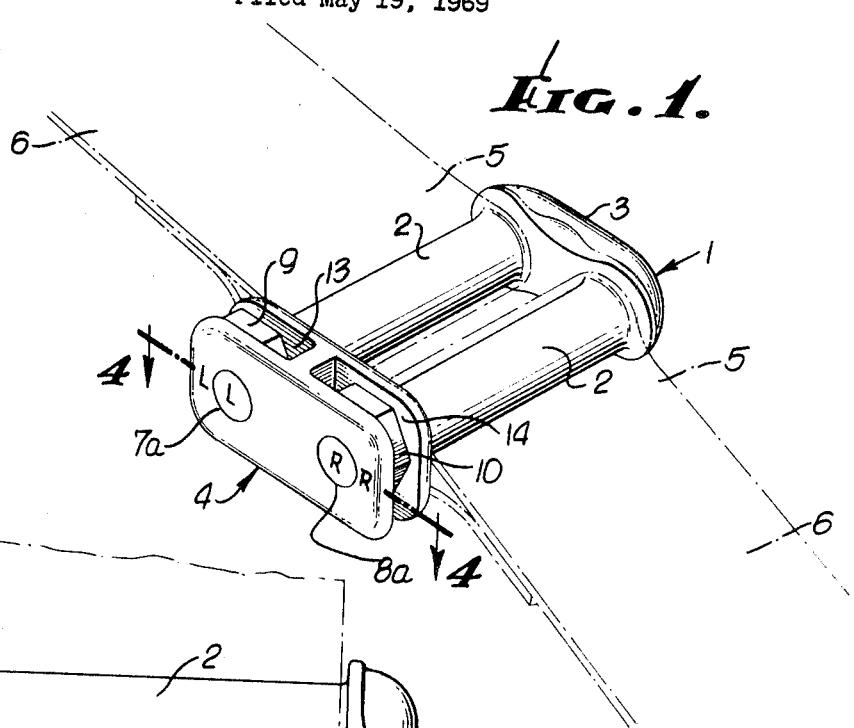
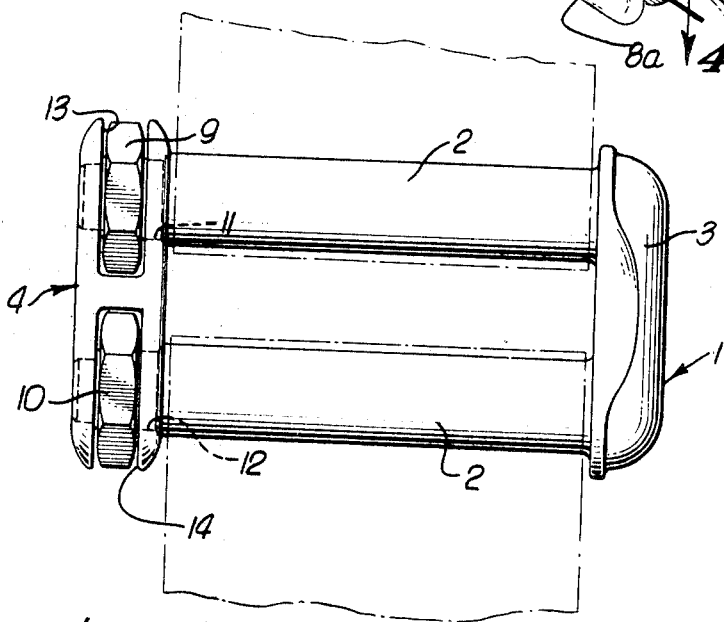
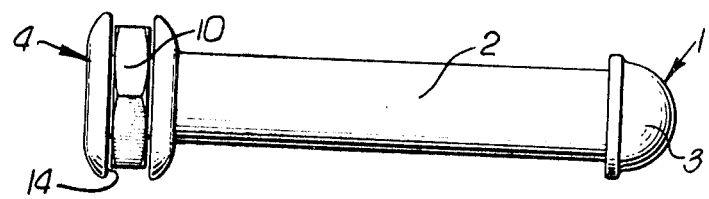
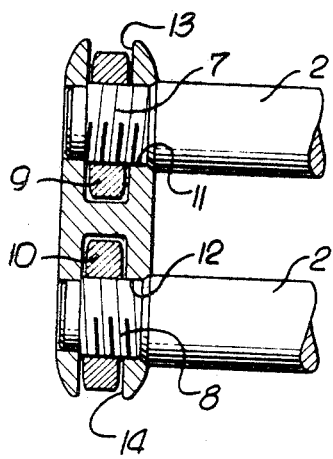
INVENTOR.
JAN R. COYLE
BY
Newton H. Lee, Jr.

United States Patent Office 3,583,045
Patented June 8, 1971

3,583,045
PARACHUTE CONNECTOR LINK
Jan R. Coyle, San Dimas, Calif.
(P.O. Box 297, Milford, Utah 84751)
Filed May 19, 1969, Ser. No. 825,843
Int. Cl. A44c 5/18
U.S. Cl. 24—265                                    6 Claims

ABSTRACT OF THE DISCLOSURE

A connector link assembly for parachute harness, said assembly having a U-shaped frame and a bar connected to the arms of the frame by nuts of opposite hand threads, the nuts being confined in slots in the bar.

BACKGROUND OF THE INVENTION

Connector links comprising a U-shaped frame having a pair of parallel arms and an integral bight portion and a bar removably attachable to the free ends of the frame, are employed in certain parachute harness for connecting portions of the harness together. When the bar is removed from the arms, the looped end of a parachute harness may be slipped onto one of the arms, and another looped end of another harness can be slipped onto the other arm of the frame. The bar is then attached to the ends of the frame arms to retain the harness loops in place and to rigidly interconnect the ends of the arms, so that the assembled link is rugged and can withstand large forces applied to the parachute harness.

An example of the application of such a connector link to parachute harness is the connection of drag parachutes to first-landing jet aircraft, the parachute being deployed to act as a brake to stop the aircraft. In such applications of the connector links they are subjected to severe strain and vibration so that retention of the retainer bar on the ends of the arms of the connector frame has posed problems.

Heretofore, the bar has been retained in place by screw fasteners which extend into holes which are formed in the ends of the frame arms. Such a structure is weak due to the removal of the material from the ends of the frame arms and vibration produces a tendency for the screw fasteners to loosen.

SUMMARY OF THE INVENTION

The present invention provides a rugged, stronger connector link assembly which is insensitive to vibration and which therefore is safer and more reliable in use.

More particularly, the present invention provides a connector link for parachute harness, wherein the bar is connected to the ends of the frame arms in a unique manner resulting in increased strength as compared with the prior devices and also the means for connecting the bar to the arms is insensitive to vibration, that is, the bar will not be loosened by vibration.

In accomplishing these objectives, the bar is slotted to receive a pair of nuts adapted to be threaded onto the oppositely threaded ends of the connector frame arms, the nuts being limited in their permitted extent of axial movement to the clearance provided by the slots, whereby vibration tending to cause rotation of the nuts in either direction will cause one nut to be tightened on its arm, and the other nut will be permitted to loosen only to the extent of the clearance afforded by its slot.

Other objects and advantages of the invention will be hereinafter described or will be apparent to those skilled in the art, and the invention will best be understood from the following detailed description of the illustrative embodiment shown in the accompanying drawings.

BRIEF DESCRIPTION OF THE DRAWINGS

FIG. 1 is an isometric view showing a connector link embodying the invention and connecting harness sections together;

FIG. 2 is a plan view illustrating the connector link assembly;

FIG. 3 is a view in side elevation;

FIG. 4 is a view in section, as taken on the line 4—4 of FIG. 1.

DESCRIPTION OF THE PREFERRED EMBODIMENT

As seen in the drawings, the connector link of the invention comprises what may be characterized as a frame 1, this frame including a pair of parallel arms 2, 2 interconnected at one end by a bight portion 3 so as to be generally U-shaped, the other end of the arms being adapted for interconnection by a bar 4.

The connector assembly is adapted to have looped end portions 5, 5 of harness straps 6, 6 disposed about the arms 2 to interconnect the harness sections 6. These harness sections 6 may, for example, be portions of the harness by which a drag parachute is connected to a jet aircraft, the parachute being employed as a brake when the aircraft is being landed and, therefore, subjecting the connector link to severe shock loads.

In addition, the connector link may be subjected to vibrations during flight of the aircraft, which vibrations have heretofore posed problems in respect of the manner in which the bar 4 may be effectively but removably interconnected with the ends of the arms 2 of the prior frames.

In the present invention, fastening means are employed to connect the bar 4 to the arms 2 which are insensitive to vibration, and which also, as an additional advantage, provide a stronger connection between the arms 2 to resist shock loads when a parachute is deployed.

More particularly, the frame 1 may be made as a forging, for example, in which the bight portion 3 is integral with the arms 2 and provides a rugged connection between the arms at one end thereof. At the other end of the arms, they are externally threaded by the provision of threads of opposite hand. Thus, one of the arms 2 has a left hand thread 7 thereon, and the other arm has a right-hand thread 8 thereon. As indicated in FIG. 1, the end faces 7a and 8a, respectively, of the arms 2 may be appropriately stamped to indicate the hand of the thread thereon. These threaded ends 7 and 8 are adapted to receive corresponding oppositely threaded nuts 9 and 10, which as also seen in FIG. 1, may be provided with suitable indicia of the hand of the thread therein.

The bar 4 is provided with parallel bores 11 and 12 adapted to receive the threaded ends 7 and 8 of the arms 2, these bores 11 and 12 intersecting a pair of oppositely laterally opening slots 13 and 14 formed in the bar 4. These slots are adapted to receive the nuts 9 and 10 and to afford small clearance between the opposing walls of the slots and the end faces of the nuts, whereby the nuts are free for rotation in the slots of the bar 4 on the threaded ends 7 and 8 of the arms 2. However, the opposing walls of the slots provide abutment means engageable by the end faces of the nuts for preventing individual rotation of either nut a distance greater than will take up the small clearance between the nuts and the opposing walls of the slots.

It will be understood, now, that with such a construction, it is necessary that both nuts 9 and 10 be oppositely and simultaneously rotated on the threaded arm ends 7 and 8 either to apply the bar 4 to the arms 2 or to, more importantly, remove the bar 4 from the arms.

Under these circumstances, it will now be apparent that following application of the harness loops 5, 5 to the arms 2 and attachment of the bar 4 to the arms 2, the bar must, thereafter, be purposely removed. This is to say, during flight of an aircraft in which parachute gear, either a drag parachute, or otherwise, is equipped with connector links made in accordance with the invention, vibration is not effective to cause the simultaneous rotation of both nuts in opposite directions, even though different vibrations may tend to cause rotation of the both nuts simultaneously in the same direction. Instead, one nut 9 or 10 then may tend to loosen within the limits of the opposing faces of the respective slots 13 and 14, but the other nut will be correspondingly caused to tighten. Thus, the bar 4 is securely connected to the arms 2 against inadvertent removal, requiring the purposeful rotation of both nuts simultaneously in opposite directions for removal of the bar 4.

Moreover, the externally threaded ends 7 and 8 of the arms 2 are strong as compared with prior connector link assemblies in which substantial material is removed from the ends of the arms by the formation of internally threaded bores adapted to hold the bar on the ends of the arms 2.

It will be understood that changes and alterations may be resorted to without departing from the invention.

What is claimed is:

1. In a connector link for harness comprising: a U-shaped frame having a pair of parallel arms and an integral bight portion, a bar removably connectable to the free ends of said arms, and means for removably securing said bar on said free ends of said arms, the improvement wherein said means comprises threaded means of opposite hand for connecting said bar to the respective ends of said arms.

2. A connector link as defined in claim 1, wherein said threaded means comprises threaded ends of opposite hand on the respective ends of said arms, threaded nuts of correspondingly opposite hand engageable with said threaded ends, and said bar having means for limiting rotation of said nuts individually.

3. A connector link as defined in claim 1, wherein said bar is provided with means cooperative with said threaded means for limiting rotation of said threaded means individually.

4. A connector link as defined in claim 1, wherein said threaded means comprises threaded ends of opposite hand on the respective ends of said arms, threaded nuts of correspondingly opposite hand engageable with said threaded ends, said bar having bores for receiving said ends, and slots in said bar intersected by said bores for receiving said nuts.

5. A connector link as defined in claim 1, wherein said threaded means comprises threaded ends of opposite hand on the respective ends of said arms, threaded nuts of correspondingly opposite hand engageable with said threaded ends, said bar having bores for receiving said ends, and slots in said bar intersected by said bores for receiving said nuts, said slots opening laterally of said bar.

6. A connector link as defined in claim 1, wherein said threaded means comprises threaded ends of opposite hand on the respective ends of said arms, threaded nuts of correspondingly opposite hand engageable with said threaded ends, said bar having bores for receiving said ends, and slots in said bar intersected by said bores for receiving said nuts, said slots opening laterally of said bar and having opposing faces engageable by said nuts, whereby said nuts may rotate on said threaded ends only simultaneously and oppositely.

References Cited
UNITED STATES PATENTS

| | | | |
|---|---|---|---|
| 2,447,921 | 8/1948 | Thomas | 24—265 |
| 2,829,414 | 4/1958 | Thomas | 24—265 |
| 2,839,809 | 6/1958 | Warner | 24—265 |
| 2,846,746 | 8/1958 | Webster | 24—265 |
| 3,065,513 | 11/1962 | Warner | 24—265 |

RICHARD J. HERBST, Primary Examiner

G. P. CROSBY, Assistant Examiner

U.S. Cl. X.R.

59—85; 85—1